United States Patent [19]

Chiang

[11] Patent Number: 5,065,523

[45] Date of Patent: Nov. 19, 1991

[54] STRUCTURE OF ISOMETRIC ELLIPSE SCALE

[76] Inventor: Chieh-Tseng Chiang, No. 4, Alley 1, Lane 323, Sec. 3, I Chen Rd., Tang San Hsien, I Lan Hsien, Taiwan

[21] Appl. No.: 637,677

[22] Filed: Jan. 7, 1991

[51] Int. Cl.[5] .................... B43L 13/20; B43L 11/055; G09B 11/04

[52] U.S. Cl. .................... 33/562; 434/87

[58] Field of Search .................... 33/562, 563, 565, 566, 33/30.1, 30.3, 23.11; 434/85, 87, 88

[56] References Cited

U.S. PATENT DOCUMENTS

| | | | |
|---|---|---|---|
| D. 141,882 | 7/1945 | Matson | 33/565 X |
| D. 167,043 | 6/1952 | Kintz | 33/565 X |
| 2,950,537 | 8/1960 | Fixen | 33/565 |
| 4,274,459 | 6/1981 | Galajda | 33/563 X |
| 4,594,792 | 6/1986 | Cramb | 33/562 |
| 4,688,330 | 8/1987 | Konrad | 33/565 X |

OTHER PUBLICATIONS

"Engineering Equipment and Supplies", Warren-Knight, 3/59 p. 20, No. 124 Large Isometric Ellipses.

*Primary Examiner*—William A. Cuchlinski, Jr.
*Assistant Examiner*—C. W. Fulton

[57] ABSTRACT

An isometric ellipse scale for drawing ellipse of different size, comprising a body, a plurality of isometric ellipse molding plates that set one inside another, two fastening slides, and a casing for keeping said parts. The body and the isometric ellipse molding plates have each two pairs of parallel rails at two opposite ends and respectively longitudinally aligned so that the fastening slide can be respectively fastened therein to selectively secure the isometric ellipse molding plates to the body for drawing ellipse. The casing has an elliptical, raised portion at the center of the inner bottom thereof and made in size according to the elliptical center hole of the smallest one of the isometric ellipse molding plates for holding the isometric ellipse molding plates and the body in position.

3 Claims, 2 Drawing Sheets

STRUCTURE OF ISOMETRIC ELLIPSE SCALE

BACKGROUND AND SUMMARY OF THE INVENTION

The present invention relates to a structure of isometric ellipse scale which comprises a plurality of isometric ellipse molding pates movably set in the body thereof with one engaged inside another, which isometric ellipse molding plates can be alternatively mounted in position for drawing ellipse according to required size.

The main object of the present invention is to provide an isometric ellipse scale which is convenient for drawing ellipse.

Another object of the present invention is to provide an isometric ellipse scale which is compact and convenient to carry.

Still another object of the present invention is to provide an isometric ellipse scale which provides numerous isometric ellipse molding plates for drawing different size of ellipse respectively.

BRIEF DESCRIPTION OF THE DRAWINGS

FIG. 2-1 is a front view of an ellipse molding plate according to the present invention.

FIG. 2-2 is a side view of an ellipse molding plate according to the present invention.

FIG. 3-1 is a sectional front view of the casing of the preferred embodiment of the present invention.

DETAILED DESCRIPTION OF THE PREFERRED EMBODIMENT

Figure 1:
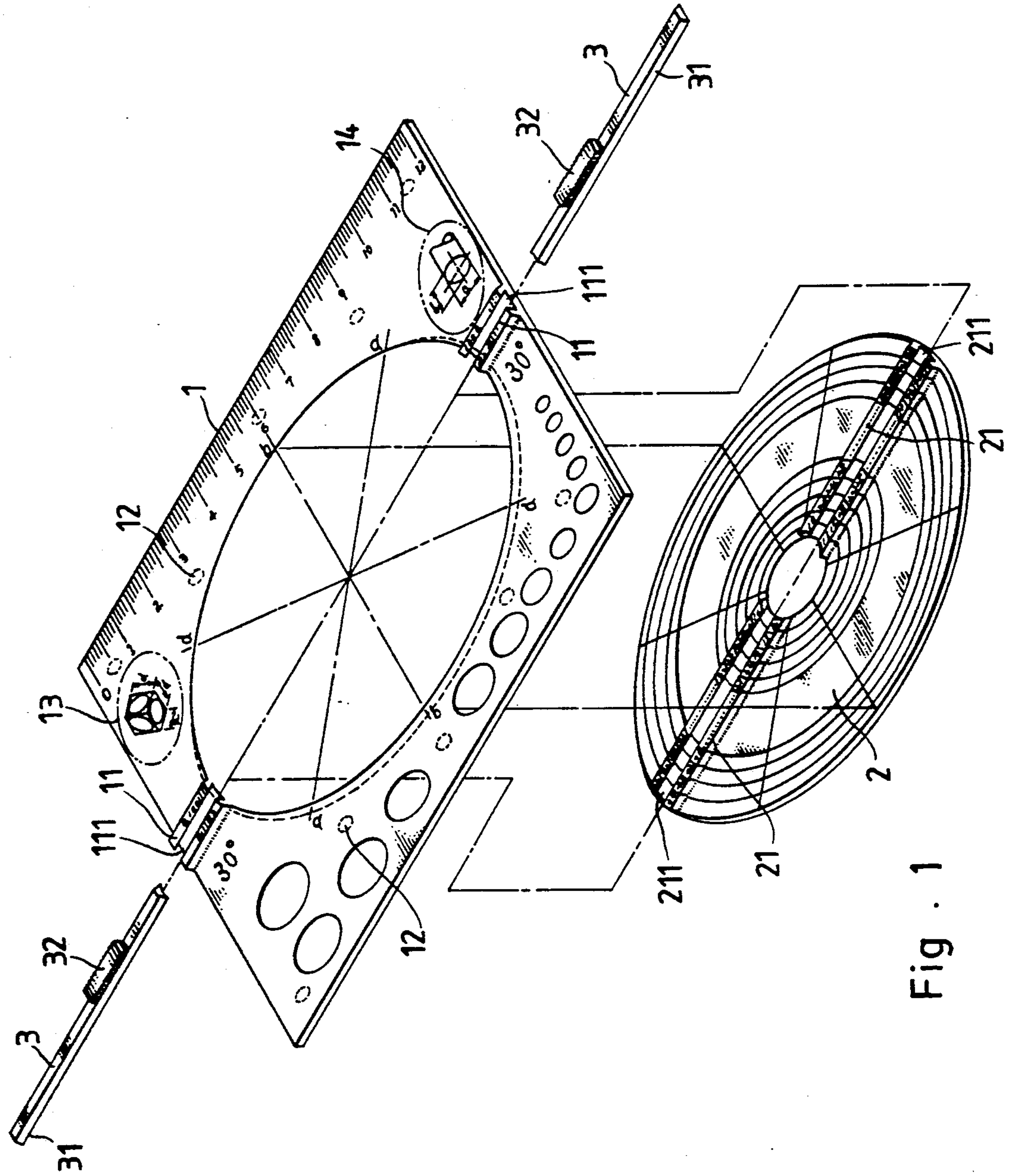
FIG. 1 is a perspective dismantled view of an isometric ellipse scale constructed according to the present invention.
Figure 2:
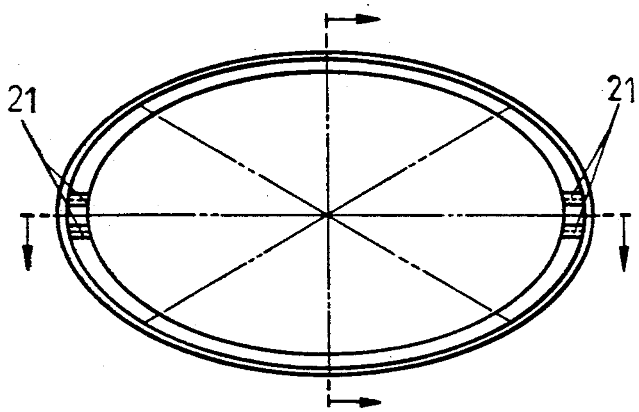
FIG. 2 is a plan view of an ellipse molding plate according to the present invention.
Figure 2:
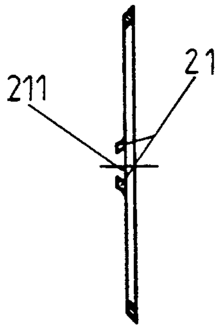
Figures 1, 2:
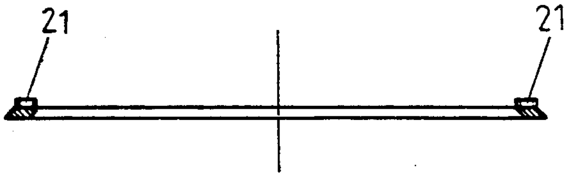
Figure 3:
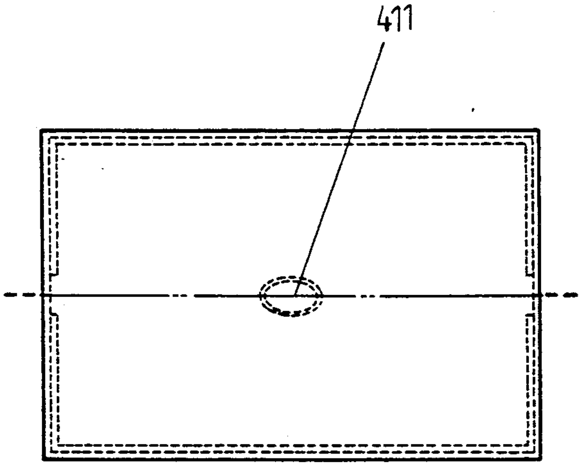
FIG. 3 is a top view of the casing of the preferred embodiment of the present invention.
Figures 1, 3:
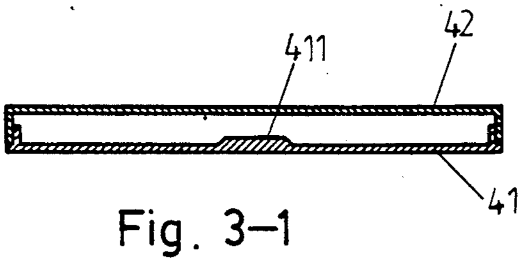

Referring to FIGS. 1 through 3, an isometric ellipse scale is generally comprised of a body 1, a set of isometric ellipse molding plates 2 that are set one inside another, two fastening slides 3 and a casing 4. The body 1 has an elliptical opening at the center for mounting the isometric ellipse molding plates 2, two pairs of parallel rails 11 at two opposite ends defining therein a dovetailed sliding way 111 each for fastening the fastening slides 3, and a plurality of raised portions 12 on the bottom. A linear scale may be made on the body 1 at one side and, a plurality of isometric ellipse molding holes of different size may be made on the body 1 at an opposite side. Markings 13 and 14 are respectively made on the body 1 at two opposite ends for indicating the relative position of each of the isometric ellipse molding plates 2. The set of isometric ellipse molding plates 2 is comprised of a plurality of isometric ellipse molding plates that set one inside another of which each has two pairs of parallel rails 21 at two opposite ends defining therein a dovetailed sliding way 211 each. The fastening slides 3 have each a finger-hold portion 32 at the top of an elongated strip 31 which has a dovetail-shaped cross section fitting in with the dovetailed sliding way 111 or 211. Through the finger-hold portion 32, the elongated strip 31 can be conveniently moved to slide in the dovetailed sliding way 111 or 211. When the isometric ellipse molding plates 2 are put in the elliptical opening of the body 1, the parallel rails 11 of the body 1 are longitudinally aligned with the parallel rails 21 of the isometric ellipse molding plates 2 so that the fastening slides 3 can be fastened respectively in the dovetailed sliding ways 111 and 211 from two opposite ends to firmly secure the isometric ellipse molding plates 2 to the body 1. When either one of the isometric ellipse molding plates 2 is secured to the body 1 for drawing an ellipse on a paper, it is spaced from said paper by the raised portion 12 of the body 1 to prevent any possible contamination of ink.

Further, the body 1 as well as the isometric ellipse molding plates 2 are each marked with two different markings, one for indicating the length of the major axis (assigned code is a), the another for indicating the diameter (assigned code is d) or the length of the minor axis (assigned code is b).

According to the present invention, the isometric ellipse molding plates can be made of plastic, metal or any suitable material.

Referring to FIG. 3 again, therein illustrated is a casing 4 for keeping the body 1 and the isometric ellipse molding plates 2. The casing 4 is comprised of a base 41 for holding the body 1 and the isometric ellipse molding plates 2, and a cover 42 covered on said base 41. The base 41 has an elliptical, raised portion 411 which is made in size according to the elliptical center hole of the smallest one of the isometric ellipse molding plates 2. Therefore, when the isometric ellipse molding plates are not in use, they can be mounted on the elliptical, raised portion 411 inside the casing 4 and firmly retained thereto.

I claim:

1. An isometric ellipse scale, comprising:

a body having an elliptical opening at the center, two pairs of parallel rails on the top edge thereof at two opposite ends, said two pairs of parallel rails each defining therein a dovetailed sliding way, a plurality of ellipse molding holes of different size on the top surface thereof at one side relative to said elliptical opening, a linear scale on the to surface thereof at an opposite side relative to said elliptical opening, and a plurality of raised portions symmetrically disposed at the bottom thereof;

a plurality of isometric ellipse molding plates that set one inside another with the topmost edge fitting flush with one another, each having an ellipse molding hole for drawing an ellipse and each being marked with markings for indicating the related diameter and major axis or minor axis, said isometric ellipse molding plates being releasably fastened in said body at said elliptical opening;

two fastening slides having each a dovetailed cross section suiting the size of said dovetailed sliding way, and movably fastened in said two pairs of parallel rails to secure said isometric ellipse molding plates in said elliptical opening of said body; and a casing for keeping said body, said fastening slides and said isometric ellipse molding plates.

2. The isometric ellipse scale of claim 1, wherein said isometric ellipse molding plates each have two pairs of parallel rails on the top at two opposite ends, made in size equal to and longitudinally respectively aligned with the two pairs of parallel rails on said body for fastening said two fastening slides.

3. The isometric ellipse scale of claim 1, wherein said casing has an elliptical, raised portion at the center of the inner bottom thereof and made in size according to the elliptical center hole of the smallest one of said isometric ellipse molding paltes for holding said isometric ellipse molding plates and said body in position.

* * * * *